N. H. SHAW.
WOOD SAW FRAME.
APPLICATION FILED MAR. 23, 1914.
1,153,646.
Patented Sept. 14, 1915.
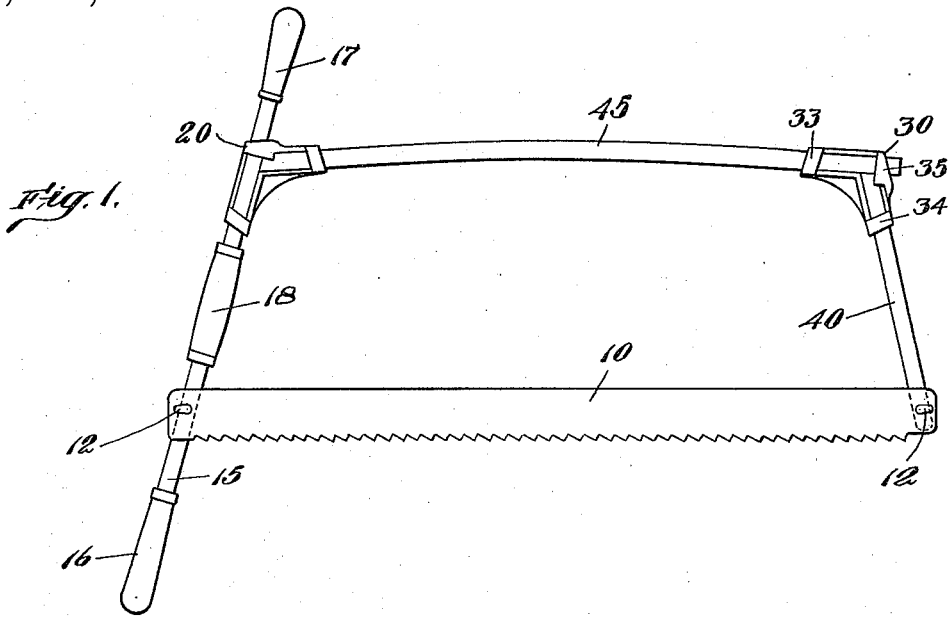
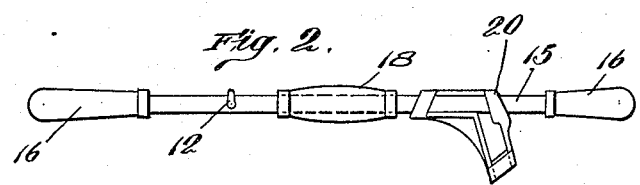
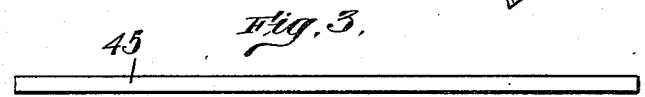
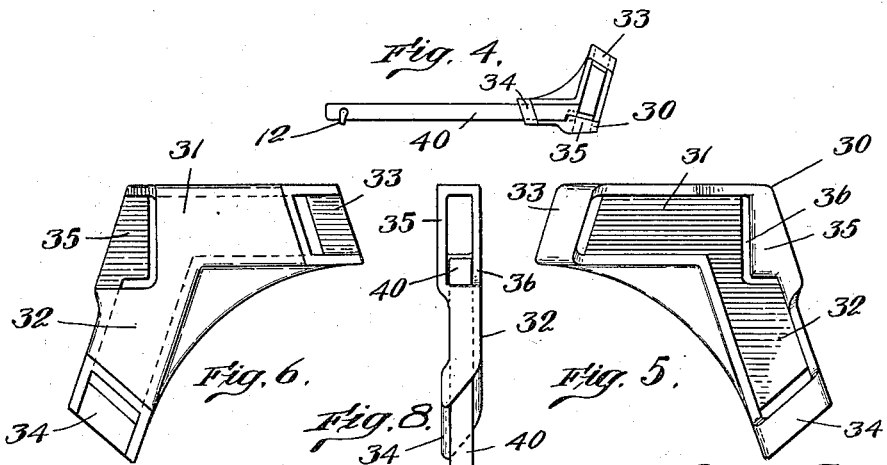
Witnesses:
H. B. Davis.
Ambrose E. Sullivan.
Inventor:
Nathaniel H. Shaw
by Hayes & Harriman.
Attys.

UNITED STATES PATENT OFFICE.

NATHANIEL H. SHAW, OF BOSTON, MASSACHUSETTS.

WOOD-SAW FRAME.

1,153,646.  Specification of Letters Patent.  Patented Sept. 14, 1915.

Application filed March 23, 1914. Serial No. 826,550.

*To all whom it may concern:*

Be it known that I, NATHANIEL H. SHAW, a citizen of the United States, residing at Boston, in the county of Suffolk and State of Massachusetts, have invented an Improvement in Wood-Saw Frames, of which the following is a specification.

This invention relates to buck-saw frames, and has for its object improvements in its construction whereby its component parts may be easily and quickly assembled or disassembled by any person without the use of tools, and when disassembled the component parts thereof may be packed for shipping or for any other purpose, and it being composed of iron and metal will always be in perfect order ready for use, without special adjustment.

The complete device comprises three pieces of straight flattened spring steel and two malleable iron angular shaped couplings, and an ordinary saw-blade, all so constructed that by connecting the blade to the frame all of its parts are held firmly together under such tension as may be desired.

Figure 1 is a side elevation of a saw-frame embodying this invention. Fig. 2 is a detail view of the handle-bar having thereon handles, and one of the couplings, and means for attaching saw-blades. Fig. 3 is a detail view of the resilient beam. Fig. 4 is a detail view of the rear end-bar having thereon one of the couplings, and means for attaching a saw-blade. Fig. 5 is an enlarged front view of one of the couplings. Fig. 6 is a rear view of the same. Fig. 7 is a plan view of the same with the resilient beam broken off. Fig. 8 is a right hand side view of the same with the rear end-bar broken off.

15 represents the handle-bar which is composed of a flat bar of steel provided with an angular-shaped coupling 20 which is to couple with one end of a resilient beam, it also has means as hooks 12 for connecting the saw blade 10, and has on its ends handles 16, 17, and intermediate its length a handle 18.

40 represents the rear end bar which is composed of a flat bar of steel, one end of which is provided with an angular-shaped coupling 30, designed to couple with one end of the resilient beam, and also has means as hooks 12 for connecting the saw blade.

45 represents the resilient beam, which is composed of a flat bar of steel, the ends of which are projected into the couplings 20 and 30. The couplings 20 and 30 are constructed substantially alike, but in use are differently arranged with respect to the bars to which they are connected.

Referring particularly to Figs. 5 to 8 the coupling 30 is shown, having its body-portion formed with channels 31, 32, arranged at an obtuse angle but in continuation of each other and having embracing-straps 33, 34 and 35, arranged beyond the ends of the channeled portions and in planes above the bottom of the channels, thereby to admit of the end-portions of the bars passing beneath the straps and entering the channels. The strap 33 is arranged at the outer end of the channel 31, the strap 34 is arranged at the outer end of the channel 32, and the strap 35 is arranged at the junction of the channels 31 and 32, but the bottoms of the channels, at their junction, have an angular recess 36, over which the strap 35 extends, and said strap 35 is made of angular form, corresponding to the shape of the recess, thereby enabling it to extend over both channels of the body-portion and over both bars which are projected into said channels. These couplings are so shaped that they may be easily cast ready for use, without using cores in molding, yet provision made to receive the ends of the bars. As above set forth, the coupling 20 is constructed the same as the coupling 30. When assembling the component parts of the saw-frame the coupling 20 is placed on the handle-bar 15, said bar passing entirely through the channel 31, beneath the straps 33 and 35, and said coupling is forced onto the bar or otherwise placed thereon so that it becomes firmly secured to the bar. The coupling 30 is placed on the rear end-bar, said bar entering the channel 32, beneath the straps 34 and 35, and said coupling is forced on to said bar or otherwise placed thereon so that it becomes firmly secured thereto. One end of the resilient beam 45 is then projected into a channel 32 beneath the straps 34 and 35 of the coupling on the handle-bar and the other end of said beam is projected through the channel 31 beneath the straps 33, 35 of the coupling on the rear end-bar, and when thus disposed the beam and channels which it enters are in alinement. The beam may be thrust through the channel 31 any desirable distance, according to the length of the saw-blade which is employed, thus providing for adjustment for blades of different lengths. Then one end of the saw-blade is connected with the hook 12 on the rear end-bar 40, and then severe hand pressure is applied to the handle-bar 15, to force it in a direction toward the rear end-bar 40 until the hook 12 on said handle-bar 15 engages the saw-blade, thus completing the assembling of the frame under any desired tension.

I claim:—

1. As a new article of manufacture the saw-frame herein described comprising a handle-bar having securely arranged thereon handles and means to connect the bar with a blade and a one-piece angular-shaped coupling, a rear end-bar having securely arranged thereon means to connect it with a blade and a one-piece angular-shaped coupling each coupling having a channel arranged beyond the end of the bar upon which it is arranged, said channels being arranged in alinement and a resilient beam, the end-portions of which enter said channels and are frictionally held therein by the force applied when assembled.

2. As a new article of manufacture, the saw-frame herein described comprising a handle-bar having thereon handles, and means to connect it with a blade and a one-piece angular-shaped coupling, a rear end-bar having thereon means to connect it with a blade and a one-piece angular-shaped coupling, and a resilient beam engaging said couplings, each coupling comprising an angularly formed channeled body-portion and straps, the channels being arranged at an obtuse angle and the straps being arranged beyond the ends of the channels and in planes above the bottoms of the channels.

3. As a new article of manufacture, the saw-frame herein described comprising a handle-bar having thereon handles, and means to connect the bars with a blade and a one-piece angular-shaped coupling, a rear end coupling bar having thereon means to connect it with a blade and a one-piece angular-shaped coupling, and a resilient beam engaging said coupling, each coupling comprising a channeled body-portion and straps, the channels in the body-portion being arranged at an obtuse angle and the straps being arranged beyond the ends of the channels and in planes above the bottoms of the channels, the strap at the junction of the two channels being extended over both channels.

In testimony whereof, I have signed my name to this specification, in the presence of two subscribing witnesses.

NATHANIEL H. SHAW.

Witnesses:
B. J. NOYES,
H. B. DAVIS.

Copies of this patent may be obtained for five cents each, by addressing the "Commissioner of Patents, Washington, D. C."